(12) United States Patent
Targali et al.

(10) Patent No.: US 11,356,931 B2
(45) Date of Patent: Jun. 7, 2022

(54) WLAN ASSISTED CELLULAR NETWORK DISCOVERY AND SELECTION

(71) Applicant: T-Mobile USA, Inc., Bellevue, WA (US)

(72) Inventors: Yousif Targali, Sammamish, WA (US); Samir M. Hodroj, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/299,242

(22) Filed: Oct. 20, 2016

(65) Prior Publication Data
US 2018/0115942 A1  Apr. 26, 2018

(51) Int. Cl.
| | |
|---|---|
| *H04W 12/06* | (2021.01) |
| *H04W 48/16* | (2009.01) |
| *H04W 12/30* | (2021.01) |
| *H04W 8/04* | (2009.01) |
| *H04W 48/18* | (2009.01) |
| *H04W 60/00* | (2009.01) |
| *H04W 48/14* | (2009.01) |
| *H04W 12/04* | (2021.01) |

(Continued)

(52) U.S. Cl.
CPC ............ *H04W 48/16* (2013.01); *H04W 8/04* (2013.01); *H04W 12/06* (2013.01); *H04W 12/35* (2021.01); *H04W 48/18* (2013.01); *H04W 60/00* (2013.01); *H04W 8/12* (2013.01); *H04W 12/04* (2013.01); *H04W 48/14* (2013.01); *H04W 84/12* (2013.01); *H04W 88/06* (2013.01)

(58) Field of Classification Search
CPC combination set(s) only.
See application file for complete search history.

(56) References Cited

U.S. PATENT DOCUMENTS

| | | | |
|---|---|---|---|
| 9,319,407 | B1 | 4/2016 | Mauer et al. |
| 2006/0212700 | A1* | 9/2006 | Zhang ............ H04L 63/08 713/167 |

(Continued)

FOREIGN PATENT DOCUMENTS

| | | |
|---|---|---|
| CN | 102960031 A | 3/2013 |
| CN | 104137504 A | 11/2014 |

(Continued)

OTHER PUBLICATIONS

3GPP TS 23.402 V8.0.0 (Dec. 2007): Technical Specification Group Services and System Aspects; Architecture enhancements for non-3GPP accesses (Release 8).*

(Continued)

*Primary Examiner* — Joseph E Avellino
*Assistant Examiner* — The Hy Nguyen
(74) *Attorney, Agent, or Firm* — Lee & Hayes, P.C.

(57) ABSTRACT

The systems, devices, and methods discussed herein are directed to a portable communication device, or a user equipment (UE), for obtaining cellular network services with an unassociated cellular network with assistance from a wireless local area network (WLAN). The UE registers with the WLAN, discovers the unassociated cellular network, sends request to a WLAN service provider of the WLAN to obtain cellular network services with the unassociated cellular network, and obtains cellular network services with the unassociated cellular network.

17 Claims, 10 Drawing Sheets

(51) Int. Cl.
*H04W 88/06* (2009.01)
*H04W 8/12* (2009.01)
*H04W 84/12* (2009.01)

(56) References Cited

U.S. PATENT DOCUMENTS

| | | | |
|---|---|---|---|
| 2007/0036120 A1* | 2/2007 | Zhang | H04L 12/14 370/338 |
| 2007/0190974 A1* | 8/2007 | Zhang | H04L 63/08 455/411 |
| 2009/0046682 A1* | 2/2009 | Kim | H04W 28/06 370/338 |
| 2011/0149806 A1 | 6/2011 | Verma et al. | |
| 2012/0044914 A1* | 2/2012 | Chen | H04W 12/08 370/338 |
| 2013/0007853 A1 | 1/2013 | Gupta et al. | |
| 2013/0272287 A1 | 10/2013 | Xiang et al. | |
| 2014/0071854 A1* | 3/2014 | Xiang | H04W 48/16 370/254 |
| 2014/0233544 A1 | 8/2014 | McCann et al. | |
| 2014/0348152 A1 | 11/2014 | Vanderhulst | |
| 2015/0105049 A1 | 4/2015 | Golaup et al. | |
| 2016/0021606 A1 | 1/2016 | Gupta | |
| 2016/0135116 A1 | 5/2016 | Chen | |
| 2016/0242111 A1* | 8/2016 | Wakabayashi | H04W 48/16 |
| 2016/0337310 A1* | 11/2016 | Faccin | H04W 76/10 |
| 2017/0155507 A1* | 6/2017 | Park | H04W 12/42 |
| 2017/0289883 A1* | 10/2017 | Kiss | H04W 4/90 |
| 2018/0115935 A1 | 4/2018 | Targali et al. | |
| 2018/0332457 A1* | 11/2018 | Thiebaut | H04W 4/90 |
| 2019/0028873 A1* | 1/2019 | Drevon | H04W 48/18 |
| 2019/0253874 A1* | 8/2019 | Salmela | H04W 60/00 |

FOREIGN PATENT DOCUMENTS

| | | |
|---|---|---|
| GB | 2522044 A | 7/2015 |
| WO | WO2013134669 | 9/2013 |
| WO | WO2014147370 A2 | 9/2014 |
| WO | WO2015043665 A1 | 4/2015 |

OTHER PUBLICATIONS

3GPP, "3rd Generation Partnership Project; Technical Specification Group Core Network and Terminals; Access Network Discovery and Selection Function (ANDSF) Management Object (MO) (Release 13)," 3GPP TS 24.312 V13.3.0, Jun. 2016, 391 pages.

3GPP, "3rd Generation Partnership Project; 3GPP, Technical Specification Group Services and System Aspects; 3GPP System Architecture Evolution (SAE); Security aspects of non-3GPP accesses (Release 13), 3GPP TS 33.402 V13.0.0 (Sep. 2015)," Sep. 2015, 56 pages.

Wi-Fi Alliance, "Wi-Fi Certified Passpoint(TM) (Release 2) Deployment Guidelines Rev 1.0," Oct. 8, 2014, 61 pages.

3GPP; TSGCNT; "Access Network Discovery and Selection Function (ANDSF) Management Object (MO) (Release 13)", 3GPP TS 24.312 V13.0.0, Sep. 25, 2015, 8 pages.

PCT Search Report and Written Opinion dated Jan. 30, 2018 for PCT Application No. PCT/US17/54879, 11 pages.

PCT Search Report and Written Opinion dated Jan. 30, 2018 for PCT Application No. PCT/US17/54891, 20 pages.

Office Action for U.S. Appl. No. 15/299,090, dated Apr. 4, 2018, Targali, "Cellular Network Assisted WLAN Discovery and Selection", 21 pages.

Office Action for U.S. Appl. No. 15/299,090, dated Apr. 9, 2019, Targali, "Cellular Network Assisted WLAN Discovery and Selection", 25 pages.

Office Action for U.S. Appl. No. 15/299,090, dated Oct. 3, 2018, Targali et al, "Cellular Network Assisted WLAN Discovery and Selection", 22 pages.

Chai et al, "On Security-Effective and Global Mobility Management for FPMIPv6 Networks", 2014 Eighth International Conference on Innovative Mobile and Internet Services in Ubiquitous Computing, IEEE, Jul. 2, 2014, pp. 247-253.

Extended European Search Report dated Jan. 2, 2020 for European Patent Application No. 17861405.3, 14 pages.

Office Action for U.S. Appl. No. 15/299,090, dated Oct. 10, 2019, Targali, "Cellular Network Assisted WLAN Discovery and Selection", 30 pages.

European Office Action dated Oct. 22, 2020 for European Patent Application No. 17861405.3, a counterpart foreign application of U.S. Appl. No. 15/299,242, 9 pages.

European Office Action dated Nov. 3, 2020 for European Patent Application No. 17861647.0, a counterpart of U.S. Appl. No. 15/299,090, 8 pages.

Translated Chinese Office Action dated Dec. 25, 2020 for Chinese Patent Application No. 201780064488.6, a counterpart foreign application of U.S. Appl. No. 15/299,090, 6 pages.

Translated Chinese Office Action dated Dec. 25, 2020 for Chinese Patent Application No. 201780064486.7, a counterpart foreign application of U.S. Appl. No. 15/299,242, 6 pages.

\* cited by examiner

WLAN ASSISTED CELLULAR NETWORK DISCOVERY AND SELECTION

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. In addition, a new generation of portable communication devices, or user equipment (UE), are capable of making phone calls over a wireless local area network (WLAN) such as Wi-Fi™ Hotspots.

As the UE enters into a new or different network coverage area, a user traveling abroad for example, the UE may not have any cellular network coverage or may begin operating in a roaming mode based on available networks in the new area. Cellular networks present in the new area may not have any relationship with a home mobile network operator (MNO) of the UE, may not be a preferred partner of the home MNO, or may not be available for the UE to access. Even if cellular networks were available, the user may be reluctant to use the cellular networks that are unknown to the user, or untrusted or unprofiled with the home MNO of the UE.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to a portable communication device, or a user equipment (UE), for obtaining cellular network services via unassociated cellular networks, i.e. cellular networks that are previously unknown, untrusted, or unprofiled with a home mobile network operator (MNO) of the UE, in an area with assistance from a wireless local area network (WLAN). A Wi-Fi capable UE may register with a WLAN, then discover available cellular networks in the area. If multiple cellular networks were available, the UE may select one or more cellular networks based on desired criteria such as signal strength, quality of service (QoS), data rate, bandwidth, security, and the like. If the available cellular networks were unassociated, i.e. unknown, untrusted, or unprofiled, with a home MNO of the UE, the UE may send a request to a WLAN service provider of the WLAN to access the selected cellular network. In response to the request, the WLAN service provider may establish communication with the selected cellular network or an authentication, authorization, accounting (AAA) server of the selected cellular network via Internet, and provide a cellular network profile of the selected cellular network required for the UE to register with the selected cellular network. The UE may then use the cellular network profile to register with the selected cellular network and obtain cellular network services with the selected cellular networks.

The systems, devices, and methods described herein can be implemented in a number of ways. Example implementations are provided below with reference to the following figures.

Figure 1:
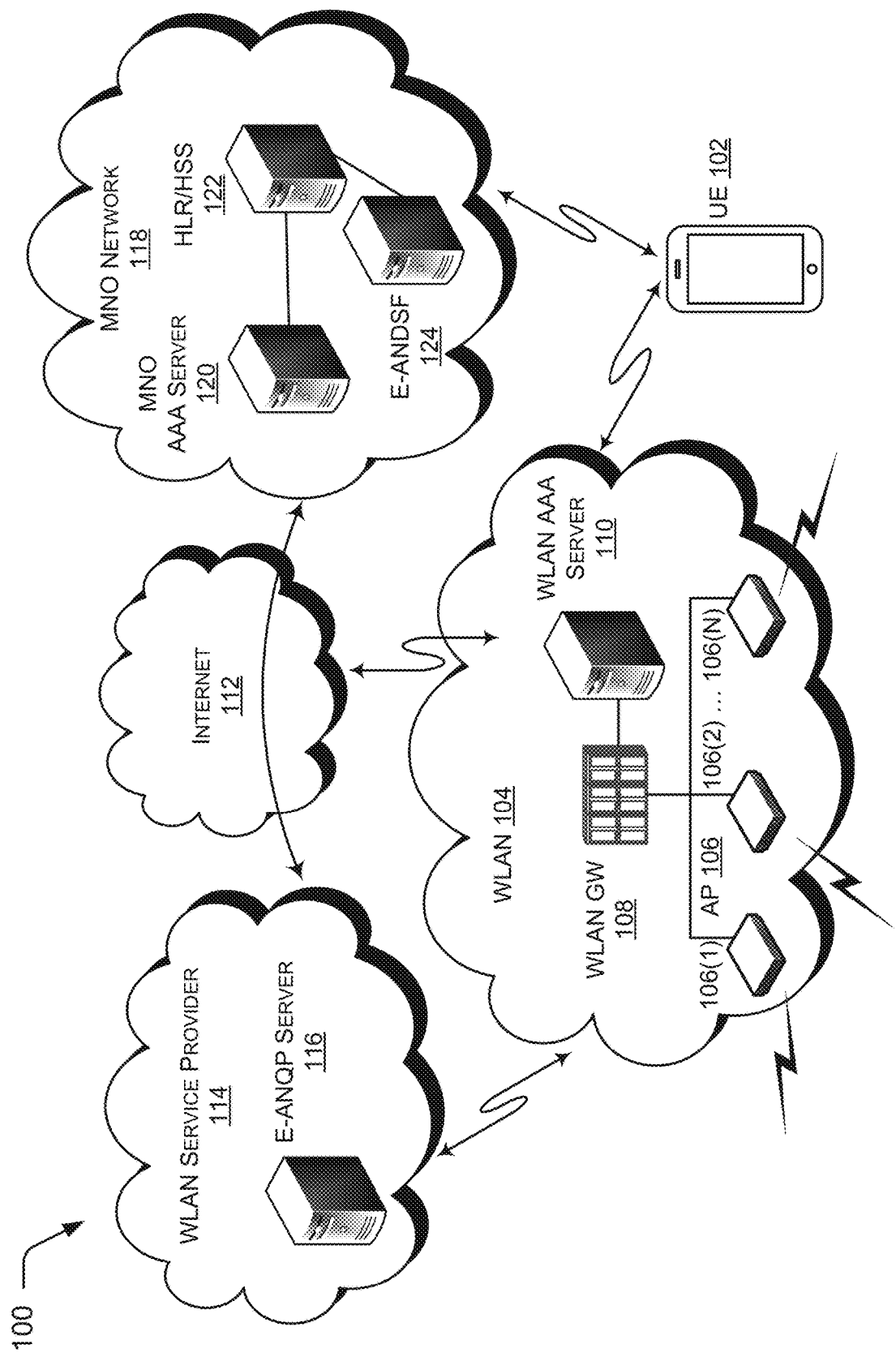
FIG. 1 illustrates an example environment in which a portable communication device, or user equipment (UE), may access unassociated cellular networks with assistance from a wireless local area network (WLAN).

FIG. 1 illustrates an example environment 100 in which a portable communication device, or user equipment (UE), 102 may access unassociated cellular networks with assistance from a wireless local area network (WLAN) 104.

The WLAN 104 comprises N access points (AP) 106 of which three (106(1), 106(2), and 106(N)) are shown, a WLAN gateway (GW) 108 communicatively coupled to the AP 106, and a WLAN authentication, authorization, accounting (AAA) server 110 communicatively coupled to the WLAN GW 108. The AP 106 is a transceiver that connects a WLAN device, such as the UE 102, to the WLAN 104. The WLAN GW 108 routes data packets from the AP 106 to other network and vice versa. The WLAN AAA server 110 tracks user activities by authenticating the user with unique identifying information, authorizing the user to access the WLAN network and services, and accounting, or tracking, the activities of the user. The WLAN AAA server 110 may be connected other servers via Internet 112. The WLAN 104 is communicatively couple to a WLAN service provider 114 which provides services accessible through APs 106 to devices registered with the WLAN 104. The WLAN service provider 114 comprises an enhanced access network quality protocol (E-ANQP) server 116, which WLAN devices, such as the UE 102, use to perform network discovery. The UE 102 is capable of establishing communication with a wireless local area network such as the WLAN 104 and with a cellular network such as a mobile network operator (MNO) network 118. The MNO network 118 may be unassociated with the UE 102 and comprises an MNO AAA server 120, a home location register/home subscriber server (HLR/HSS) 122, and an evolved access network discovery and selection function (E-ANDSF) server 124. The MNO AAA server 120 tracks user activities by authenticating the user with unique identifying information, authorizing the user to access the MNO network 118 and services, and accounting, or tracking, the activities of the user. The HLR/HSS 122 stores and updates the user subscription information, and also generates security information. The E-ANDSF server 124 assists the UE 102 in discovering WLANs and provides the UE 102 with rules and policies for connecting to the WLANs.

Figure 2:
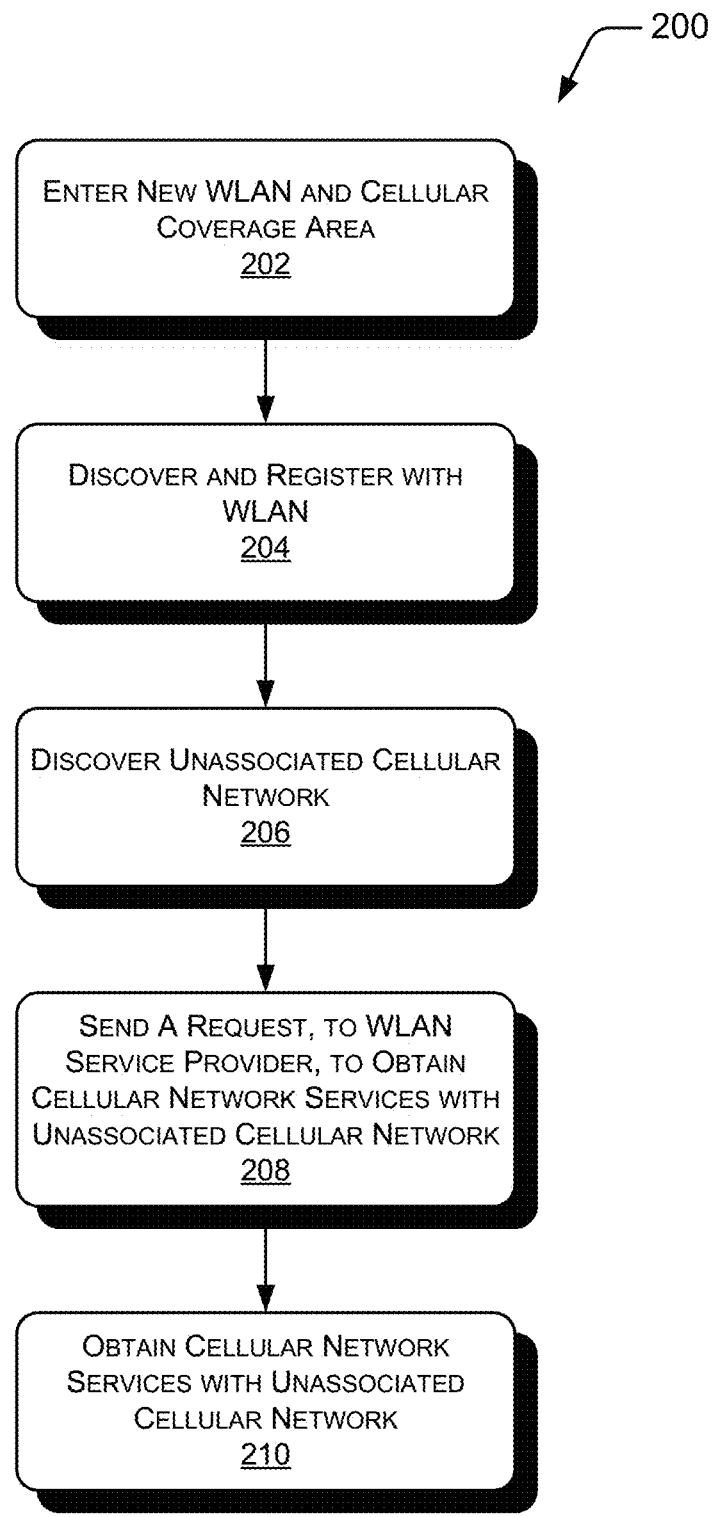
FIG. 2 illustrates an example process for the UE to access unassociated cellular networks with assistance from the WLAN.

FIG. 2 illustrates an example process 200 for the UE 102 to access cellular network services with the unassociated cellular network, such as the MNO network 118, with assistance from the WLAN service provider 114. As the user, or more specifically the UE 102, enters a new cellular and WLAN coverage area in block 202, the UE 102 may discover and register with the WLAN 104 in block 204. The UE 102 may scan and discover multiple WLANs in the area, query each E-ANQP server of the WLANs to determine availability of each WLAN, and register with a WLAN provisioned to work with the UE 102. The UE 102 may then scan and discover an unassociated cellular network, such as the MNO network 118, in block 206. Because the MNO network 118 is unassociated with the UE 102, the UE is unable to access cellular network services with the MNO network 118. In block 208, the UE 102 may send to the WLAN service provider 114 a request to obtain cellular network services with the MNO network 118. The UE 102 may then obtain the cellular network access with the MNO network 118 in block 210.

Figure 3:
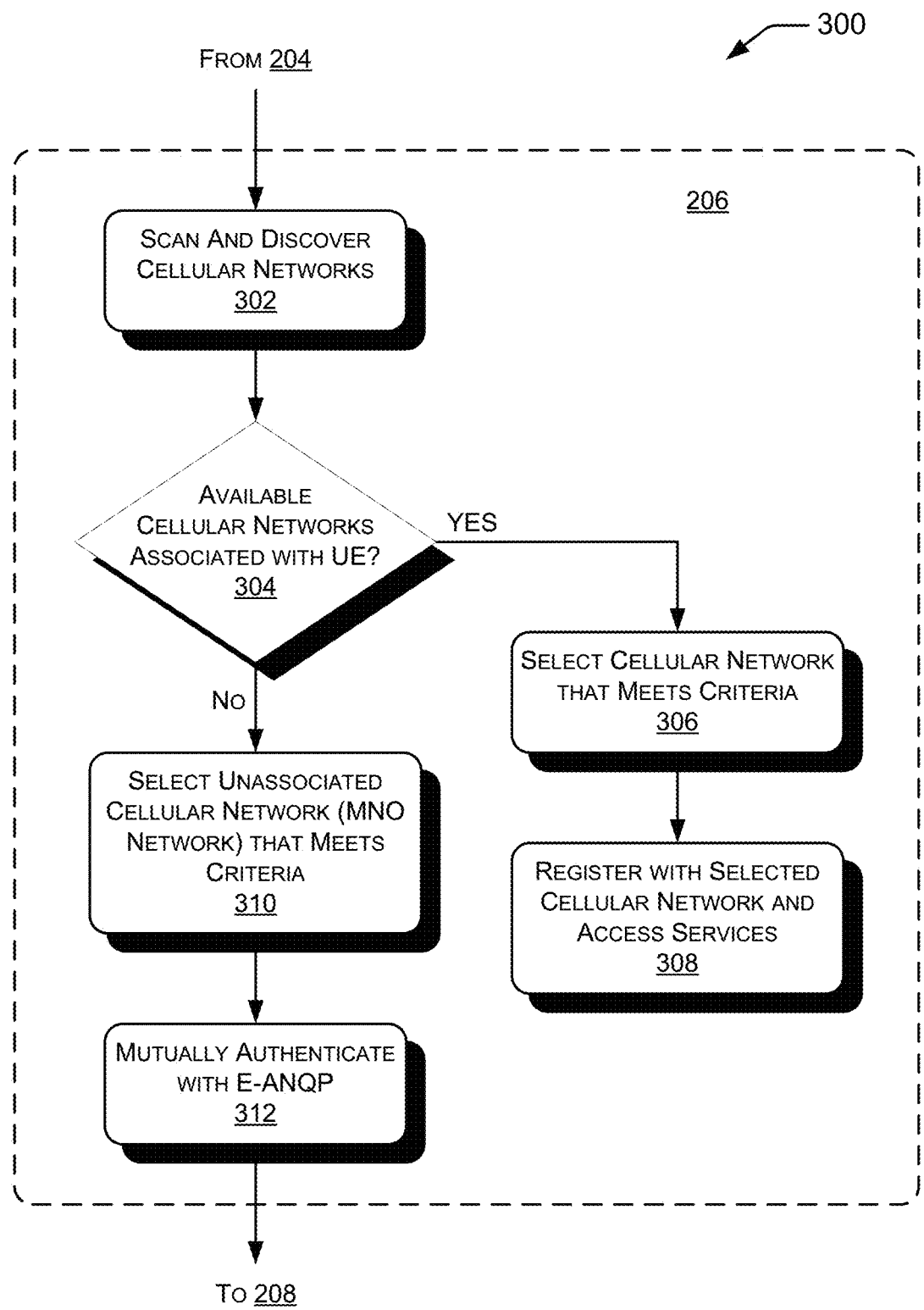
FIG. 3 illustrates an example process detailing one of the blocks of FIG. 2.

FIG. 3 illustrates an example process 300 detailing block 206 of discovering the unassociated cellular network, the MNO network 118. In block 302, as the UE 102 scans for cellular networks, it may discover one or more available cellular networks. In block 304, the UE 102 may determine if any of the available cellular networks were associated with the UE 102. If one or more of the available cellular networks were associated with the UE 102, the UE may select a cellular network that meets predetermined criteria in block 306. The predetermined criteria may include, but not limited to, signal strength, quality of service, available bandwidth, available bit rate, security, and the like. The UE 102 then registers with the selected cellular network and obtains cellular network services in block 308.

If all the available cellular networks were unassociated with the UE 102, the UE may select an unassociated cellular network, such as the MNO network 118, which meets the predetermined criteria as described above, in block 310. The UE 102 then mutually authenticate with the E-ANQP server 116 in block 312. The process then proceeds to block 208.

Figure 4:
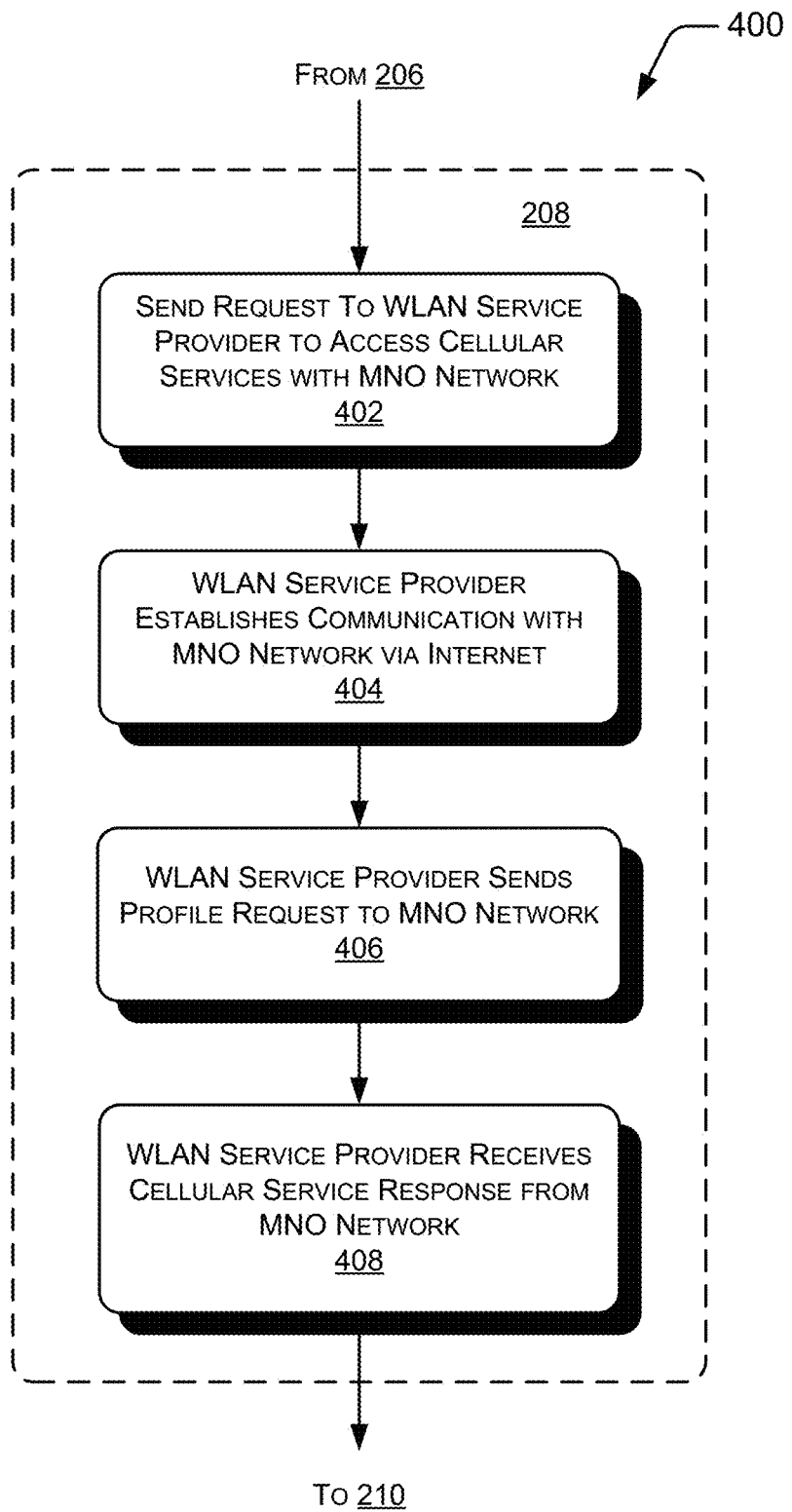
FIG. 4 illustrates an example process detailing another one of the blocks of FIG. 2.

FIG. 4 illustrates an example process 400 detailing block 208 of sending a request, to a WLAN service provider 114 of the WLAN 104, to obtain cellular network services with the unassociated cellular network, the MNO network 118. In block 402, the UE 102 may send a request to the WLAN service provider 114 to obtain cellular network services with the MNO 118. In response to the request, the WLAN service provider 114 may establish, or the request may cause the WLAN service provider 114 to establish, communication with the MNO network 118 via Internet in block 404. In block 406, the WLAN service provider 114 may send a profile request to the MNO network 118, or to the MNO AAA server 120 of the MNO network 118. The WLAN service provider 114 may also send a profile request to the HLR/HSS server 122 and/or the E-ANDSF server 124. The WLAN service provider 114 may then receive a cellular service response from the MNO network 118, which may be a cellular network profile with credentials of the MNO network 118, in block 408, and the process proceeds to block 210.

Figure 5:
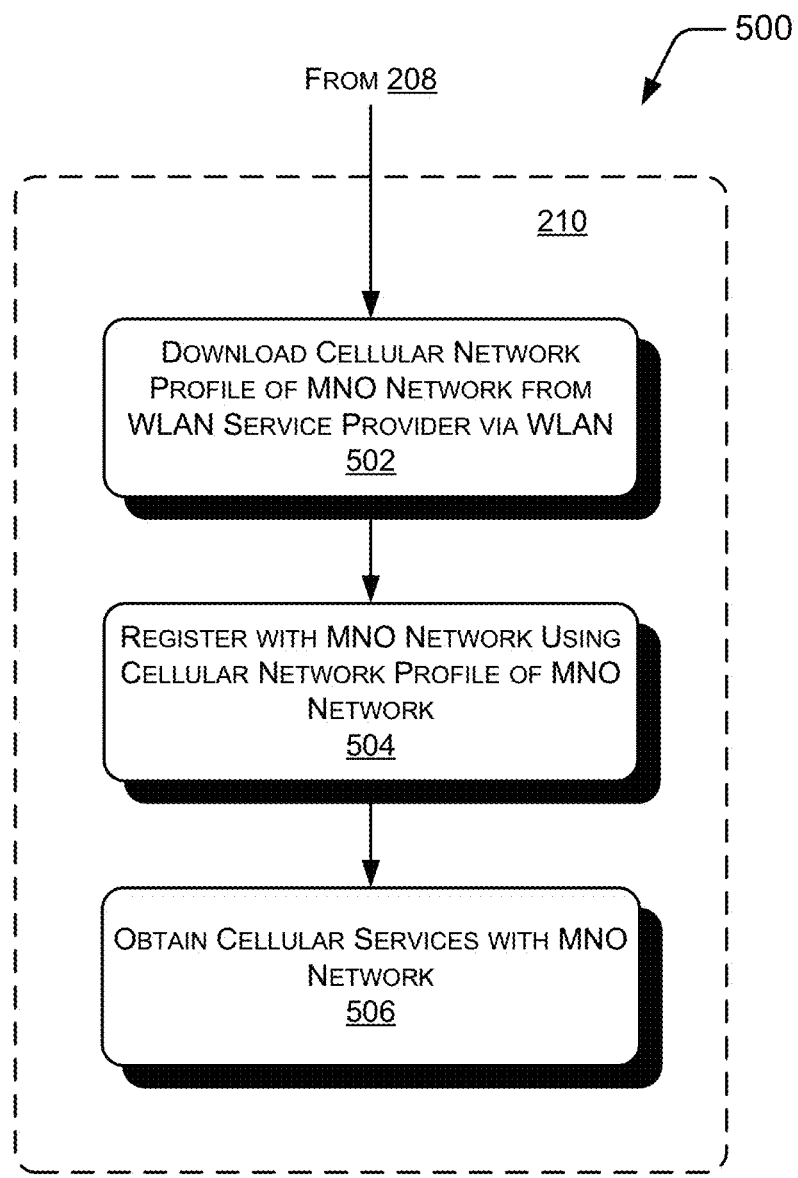
FIG. 5 illustrates an example process detailing yet another one of the blocks of FIG. 2.

FIG. 5 illustrates an example process 500 detailing block 210 of the UE 102 obtaining the cellular network services with the unassociated cellular network, the MNO network 118. In block 502, the UE 102 may download the cellular network profile of the MNO network 118 from the WLAN service provider 114 via the WLAN 104. Alternatively, the WLAN service provider 114 may transmit the cellular network profile of the MNO network 118 to the UE 102 via the WLAN 104. Using the downloaded cellular network profile, the UE 102 may register with the MNO network 118 in block 504, and may obtain cellular network services with the MNO network 118 in block 506.

Figure 6:
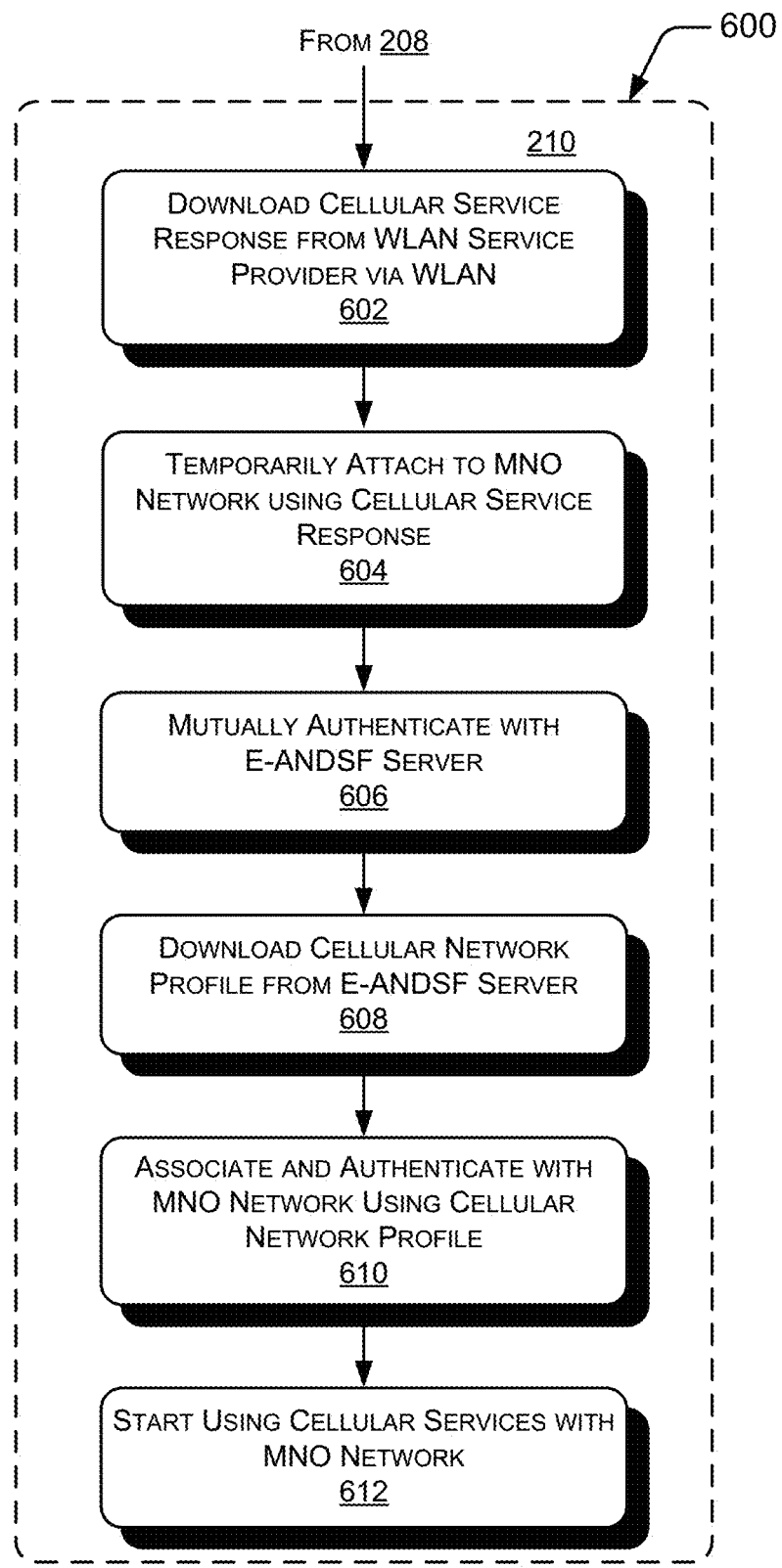
FIG. 6 illustrates an alternate example process detailing the other one of the blocks of FIG. 2.

FIG. 6 illustrates another example process 600 detailing block 210 of the UE 102 obtaining the cellular network services with the unassociated cellular network, the MNO network 118. In block 602, the UE 102 may download the cellular service response from the WLAN service provider 114 via the WLAN 104. In this example, the cellular service response is not the cellular network profile including the credentials, but is information sufficient to allow the UE 102 to temporarily attach itself to the MNO network 118. Alternatively, the WLAN service provider 114 may transmit the cellular service response to the UE 102 via the WLAN 104. In block 604, using the cellular service response, the UE 102 may attach itself to the MNO network 118, and mutually authenticate with the E-ANDSF server 124 in block 606. The UE 102 may then download the cellular network profile including the credentials from the HLR/HSS server 122 and/or the E-ANDSF server 124 in block 608. Using the downloaded cellular network profile, the UE 102 may associate and authenticate with the MNO network 118 in block 610, and may start using the cellular network services with the MNO network 118 in block 612.

Figure 7:
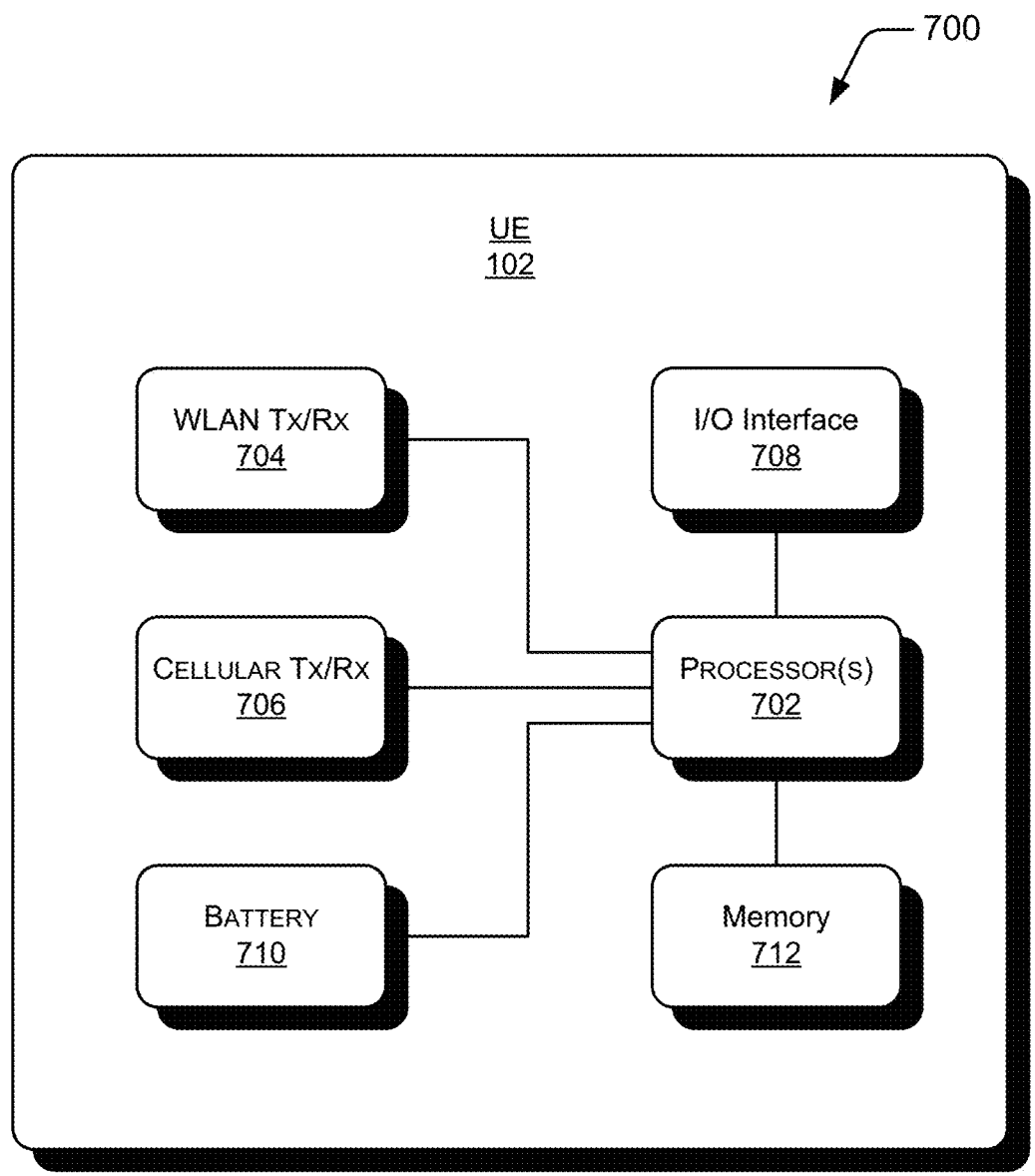
FIG. 7 illustrates an example block diagram of the UE.

FIG. 7 illustrates an example block diagram 700 of the UE 102. The UE 102 may comprise one or more processors 702, a WLAN transceiver 704, and a cellular transceiver 706. Both transceivers 704 and 706 may be communicatively coupled to the one or more processors 702, and may be directly or indirectly coupled to other components and/or modules of the UE 102. In some embodiments, the one or more processors 702 may be a central processing unit (CPU), a graphics processing unit (GPU), or both CPU and GPU, or other processing unit or component known in the art.

The WLAN transceiver 704 may be configured to establish communication between the UE 102 and a WLAN, such as the WLAN 104 described above, using a WLAN specific communication method such as 802.11 family of standards and the like. The cellular transceiver 706 may be configured to establish communication between the UE 102 and a cellular network, such as the MNO network 118 described above, using a cellular network specific communication method such as the 2G, 3G, 4G, LTE and the like.

The UE 102 may further comprise an input/output (I/O) interface 708, a battery 710, and memory 712, each communicable coupled to the one or more processors 702 and may be directly or indirectly coupled to other components and/or modules of the UE 102. The I/O interface 708 may include a keyboard, mouse, touch pad, touch screen, microphone, and the like, configured to receive an input from a user and may also include a speaker, display which may be a touchscreen, and the like, configured to provide an output for the user. The battery 710 provides power to all components and modules of the UE 102 requiring power. Memory 712 may include volatile memory (such as random access memory (RAM)) and/or non-volatile memory (such as read-only memory (ROM), flash memory, etc.). Memory 712 may also include additional removable storage and/or non-removable storage including, but not limited to, flash memory, magnetic storage, optical storage, and/or tape storage that may provide non-volatile storage of computer-readable instructions, data structures, program modules, and other data for the UE 102.

Memory 712 is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media does not include communication media.

The computer-executable instructions stored on one or more computer-readable storage media that, when executed by one or more processors, perform operations described above with reference to FIGS. 2-6. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 8:
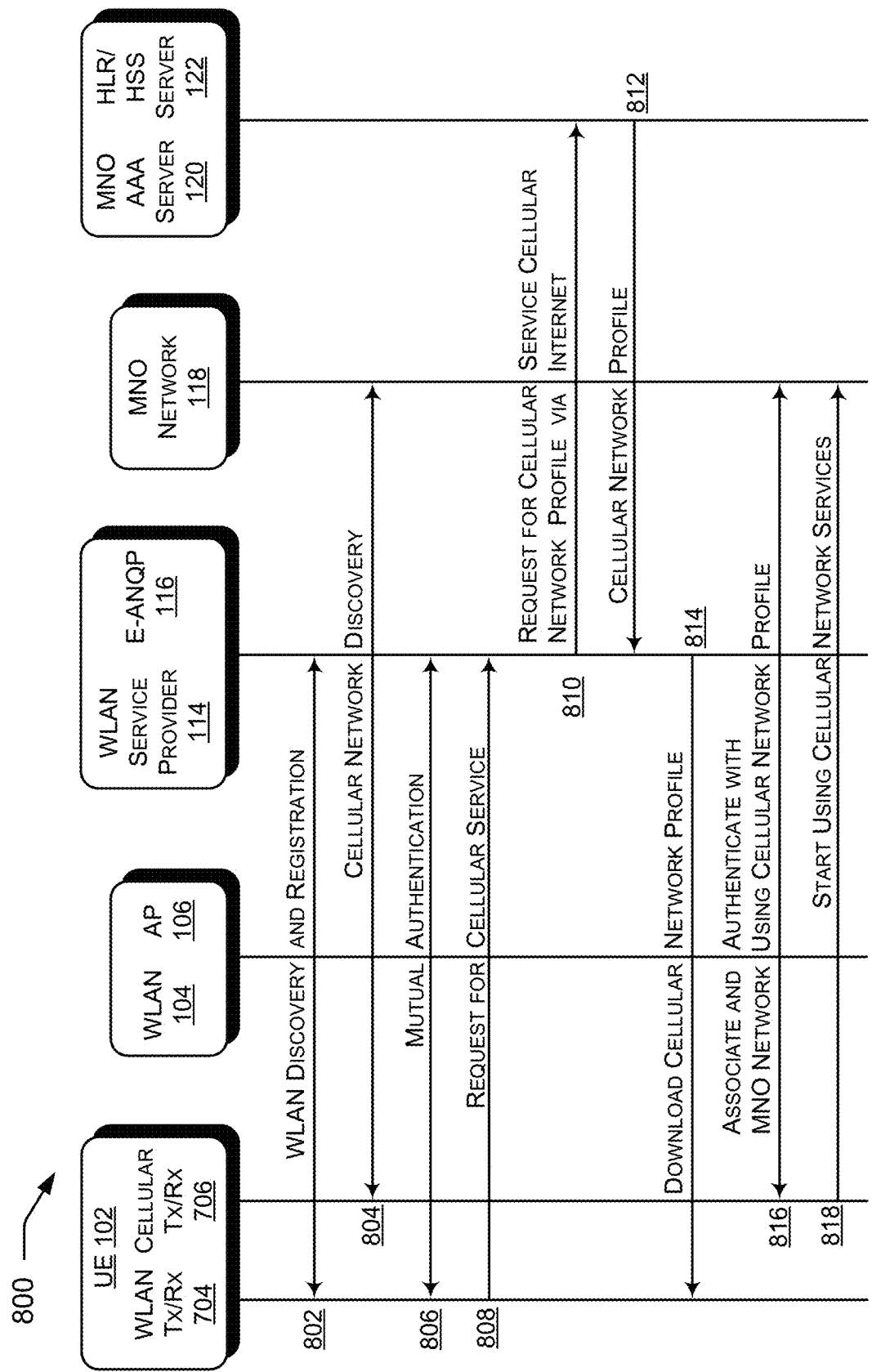
FIG. 8 illustrates an example sequence diagram for the UE to obtain cellular network services with the unassociated cellular network by downloading the cellular network profile via the WLAN.

FIG. 8 illustrates an example sequence diagram 800 for the UE 102 to obtain cellular network services with the unassociated cellular network, the MNO network 118 with assistance from the WLAN service provider 114, by downloading the cellular profile via the WLAN 104. The UE 102 may comprise the WLAN transceiver 704 and the cellular transceiver 706 as described above with reference to the UE 102 in FIG. 7. As described above with reference to block 204 of FIG. 2, at 802, the UE 102 may, with the WLAN transceiver 704, discover the WLAN 104 by querying the E-ANQP server 116, and register with the WLAN 104. At 804, the UE 102, with the cellular transceiver 706, may discover the MNO network 118 that is available but unassociated with the UE 102 as described above with reference to blocks 302-310 in FIG. 3. The UE 102 and the E-ANQP server 116 then mutually authenticate at 806.

At 808, the UE 102, with the WLAN transceiver 704, may send a request to the WLAN service provider 114 for cellular network services with the MNO network 118 as described with reference to block 402 of FIG. 4. In response, the WLAN service provider 114 may establish communication with the MNO network 118 via Internet, and send a request to the MNO AAA server 120 and the HLR/HSS server 122, for a cellular network profile, including credentials, of the MNO network 118 at 810 as described above with reference to blocks 404 and 406 of FIG. 4. At 812, the WLAN service provider 114 may receive from the MNO AAA server 120 via Internet the cellular network profile including the credentials of the MNO network 118 as described above with reference to block 408 of FIG. 4.

As described above with reference to FIG. 5, the UE 102, with the WLAN transceiver 704, may download or receive securely the cellular network profile of the MNO network 118 from the WLAN service provider 114 at 814. The UE 102 may then associate and authenticate with the MNO network 118, via the cellular transceiver 706, using the cellular network profile including the credentials of the MNO network 118 at 816. The UE 102 may then obtain cellular network services with the MNO network 118, and start using the services at 818.

Figure 9:
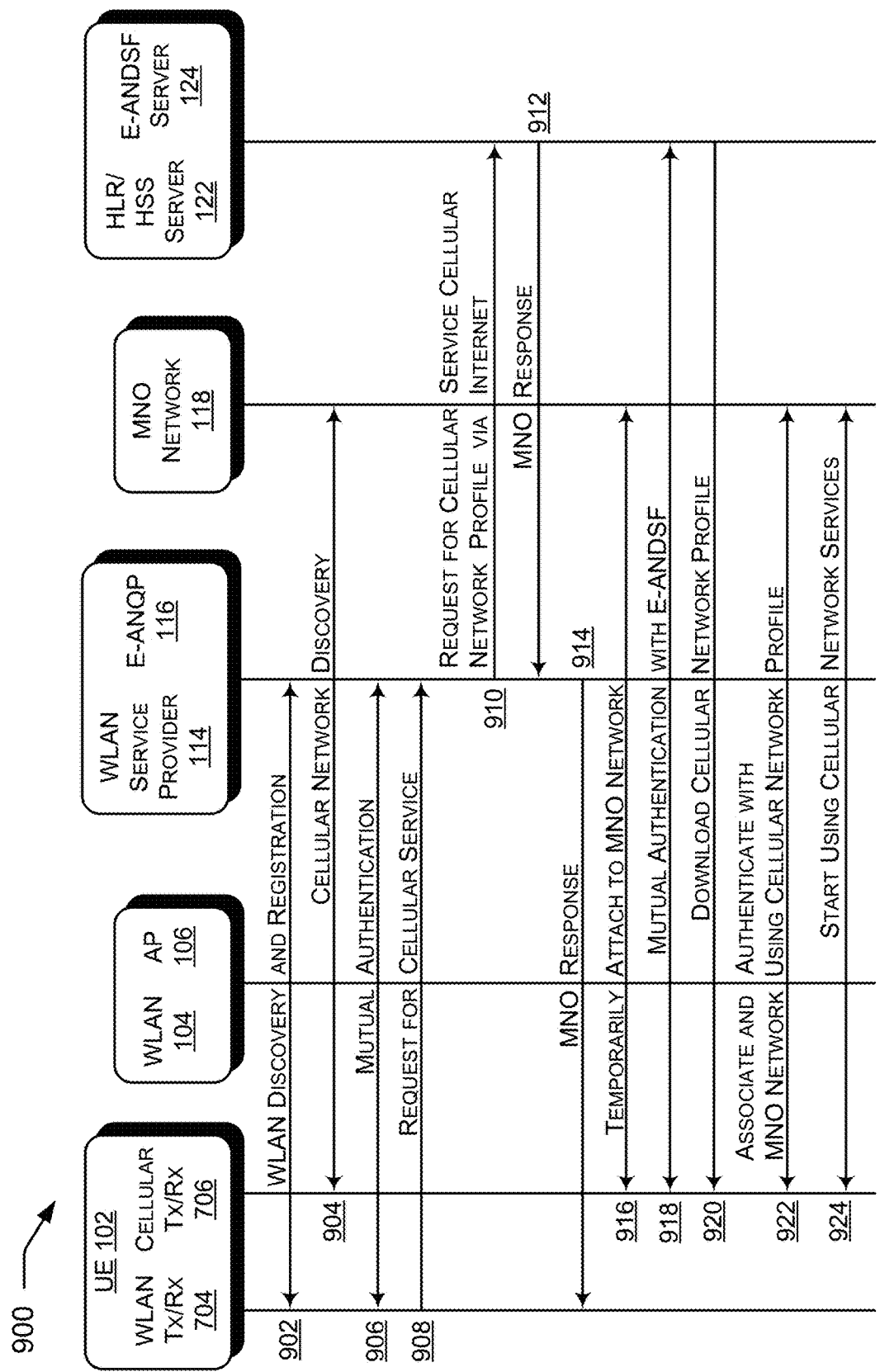
FIG. 9 illustrates an example sequence diagram for the UE to obtain cellular network services with the unassociated cellular network by downloading the cellular network profile via the cellular network.

FIG. 9 illustrates an example sequence diagram 900 for the UE 102 to obtain cellular network services with the unassociated cellular network, the MNO network 118 with assistance from the WLAN service provider 114, by downloading the cellular profile via the cellular network. The UE 102 may comprise the WLAN transceiver 704 and the cellular transceiver 706 as described above with reference to the UE 102 in FIG. 7. As described above with reference to block 204 of FIG. 2, at 902, the UE 102 may, with the WLAN transceiver 704, discover the WLAN 104 by querying the E-ANQP server 116, and register with the WLAN 104. At 904, the UE 102, with the cellular transceiver 706, may discover the MNO network 118 that is available but unassociated with the UE 102 as described above with reference to blocks 302-310 in FIG. 3. The UE 102 and the E-ANQP server 116 then mutually authenticate at 906.

At 908, the UE 102, with the WLAN transceiver 704, may send a request to the WLAN service provider 114 for cellular network services with the MNO network 118 as described with reference to block 402 of FIG. 4. In response, the WLAN service provider 114 may establish communication with the MNO network 118 via Internet, and send a request to the HLR/HSS server 122 and E-ANDSF server 124, for a cellular network profile, including credentials, of the MNO network 118 at 910 as described above with reference to blocks 404 and 406 of FIG. 4. At 912, the WLAN service provider 114 may receive from the HLR/HSS server 122 and/or the E-ANDSF server 124 via Internet a cellular service response described above with reference to block 408 of FIG. 4. The cellular service response is not the cellular network profile including the credentials, but is information sufficient to allow the UE 102 to temporarily attach itself to the MNO network 118.

As described above with reference to FIG. 6, the UE 102, with the WLAN transceiver 704, may download or receive the cellular service response from the WLAN service provider 114 at 914. At 916, using the cellular service response, the UE 102 may attach itself to the MNO network 118, and mutually authenticate with the E-ANDSF server 124 at 918. With the cellular transceiver 706, the UE 102 may then securely download the cellular network profile including the credentials from HLR/HSS server 122 and/or the E-ANDSF server 124 at 920. Using the downloaded cellular network profile, the UE 102 may associate and authenticate with the MNO network 118 at 922, and may start using the cellular network services with the MNO network 118 at 924.

Figure 10:
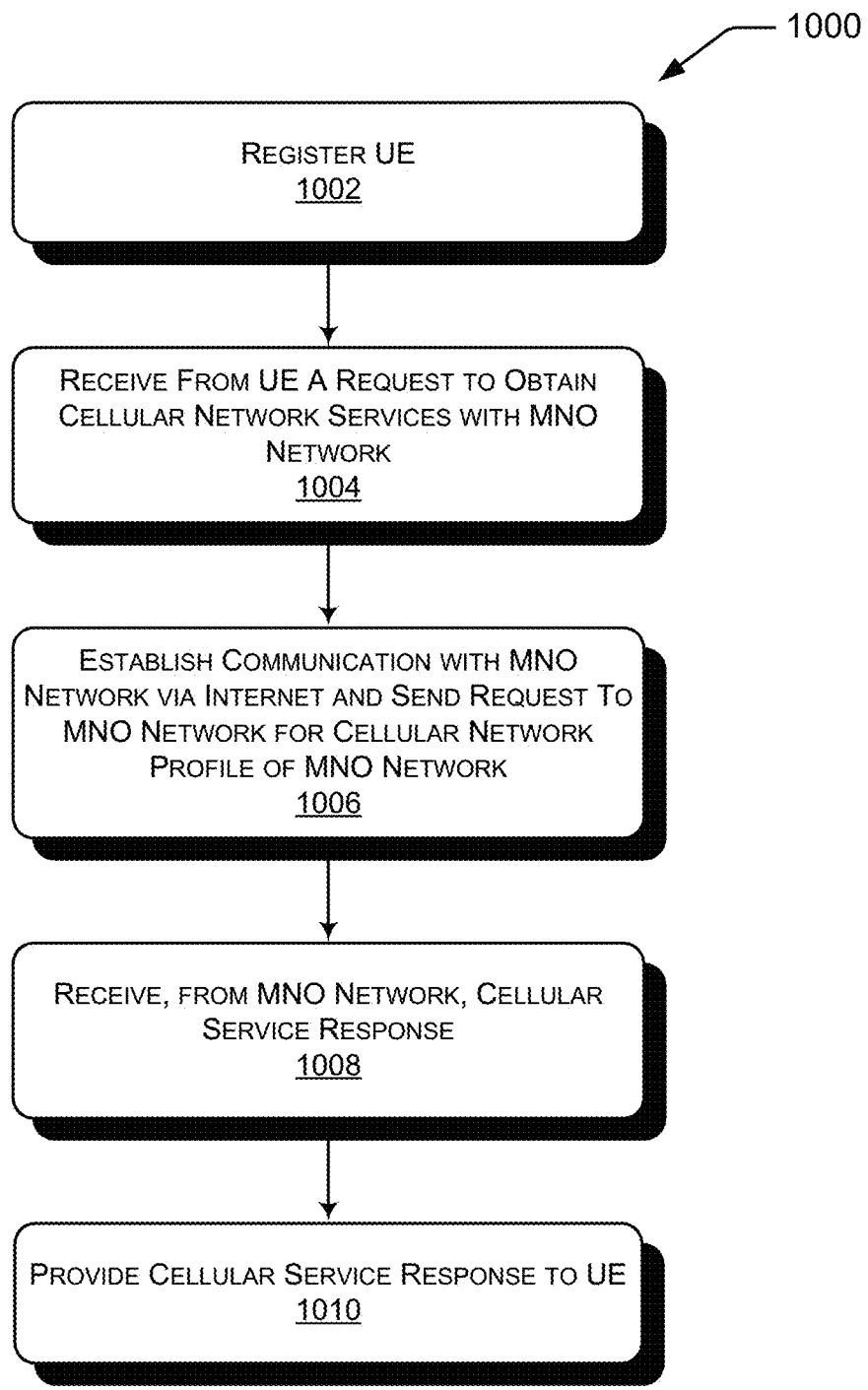
FIG. 10 illustrates an example process for the WLAN service provider to assist the UE to obtain cellular network services with the unassociated cellular network.

FIG. 10 illustrates an example process 1000 for the WLAN service provider 114 to assist the UE 102 obtaining cellular network services with the MNO network 118. In block 1002, the WLAN service provider 114 may register the UE 102, and in block 1004, may receive a request from the UE 102 to obtain cellular network services with the MNO network 118 which is unassociated with the UE 102 as described above with reference to block 402 of FIG. 4. In block 1006, the WLAN service provider may then establish communication with the MNO network 118 via Internet and send a request to the AAA server 120, the HLR/HSS server 122, and/or the E-ANDSF server 124 for a cellular network profile of the MNO network 118 as described above with reference to blocks 404 and 406 of FIG. 4. In block 1008, the WLAN service provider 114 may receive from the MNO network 118 a cellular service response, which may be the cellular network profile with credentials of the MNO network 118 as described above with reference to block 408 of FIG. 4. Alternatively, the WLAN service provider 114 may receive the cellular network profile from the MNO AAA server 120, the HLR/HSS server 122, or the E-ANDSF server 124.

In block 1010, the WLAN service provider 114 may provide the cellular service response to the UE 102, via the WLAN 104, by transmitting, or allowing the UE 102 to download, the cellular service response as described above in reference to FIG. 5. If the cellular service response is the cellular network profile, the UE 102 may, or the WLAN service provider 114 may cause the UE 102 to, then associate and authenticate with the MNO network 118 using the cellular network profile including the credentials of the MNO network 118, and start using the cellular network services with the MNO.

Alternatively, if the cellular service response is not the cellular network profile including the credentials, but is information sufficient to allow the UE 102 to temporarily attach itself to the MNO network 118, the WLAN service provider 114 may provide the cellular service response to the UE 102, via the WLAN 104 as described above in reference to FIG. 6 in block 1010. The WLAN service provider 114 may cause the UE 102 to perform the following operations. Using the cellular service response, the UE 102 may then attach itself to the MNO network 118, and mutually authenticate with the E-ANDSF server 124. The UE 102 may next securely download the cellular network profile including the credentials from HLR/HSS server 122 and/or the E-ANDSF server 124 using the cellular transceiver 706. Using the downloaded cellular network profile, the UE 102 may associate and authenticate with the MNO network 118, and may start using the cellular network services with the MNO network 118.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method in a portable communication device comprising:
    registering with a wireless local area network (WLAN);
    discovering a cellular network;
    determining that the cellular network is unknown, untrusted, or unprofiled with a home mobile network operator (MNO) of the portable communication device;
    sending a request, to a WLAN service provider of the WLAN, to obtain cellular network services with the cellular network;
    receiving, via the WLAN service provider, a cellular service response from the cellular network in response to the request, wherein the cellular service response does not include a cellular network profile that includes credentials of the cellular network; and
    obtaining, via a cellular transceiver, the cellular network services with the cellular network using the cellular service response by
        temporarily attaching to the cellular network using the cellular service response; and
        downloading the cellular network profile including the credentials from the cellular network.
2. The method of claim 1, further comprising:
    selecting the cellular network based upon predetermined criteria.
3. The method of claim 1, further comprising:
    authenticating with the WLAN service provider prior to sending the request to the WLAN service provider.
4. The method of claim 1, wherein the request causes the WLAN service provider to obtain the cellular service response from the cellular network by sending a profile request to at least one of:
    an authentication, authorization, accounting (AAA) server of the cellular network,
    a home location register/home subscriber server (HLR/HSS) of the cellular network, or
    an evolved access network discovery and selection function (E-ANDSF) server of the cellular network.
5. The method of claim 1,
    wherein if the cellular service response includes a cellular network profile including credentials of the cellular network, and
    wherein the obtaining, via the cellular transceiver, the cellular network services with the cellular network using the cellular service response comprises associating and authenticating with the cellular network via the cellular transceiver using the cellular network profile of the cellular network.
6. The method of claim 1, further comprising:
    mutually authenticating with an evolved access network discovery and selection function (E-ANDSF) server of the cellular network; and
    associating and authenticating with the cellular network via the cellular transceiver using the cellular network profile of the cellular network.
7. The method of claim 1, wherein the cellular network is not profiled with a home network of the portable communication device.
8. A portable communication device comprising:
    one or more processors;
    a wireless local area network (WLAN) transceiver communicatively coupled to the one or more processors, the WLAN transceiver configured to communicate with a WLAN;
    a cellular network transceiver communicatively coupled to the one or more processors, the cellular network transceiver configured to communicate with a cellular network;
    memory communicatively coupled to the one or more processors, the memory storing instructions and executable by the one or more processors to perform operations comprising:

registering with a WLAN by the WLAN transceiver;
discovering, by the cellular network transceiver, an unassociated cellular network by discovering, by the cellular network transceiver, an available cellular network and determining that the available cellular network is unassociated with a home mobile network operator (MNO) of the portable communication device by determining that the available cellular network is unknown, untrusted, or unprofiled with the home MNO of the portable communication device;
sending a request, by the WLAN transceiver, to a WLAN service provider of the WLAN to obtain cellular network services with the unassociated cellular network;
receiving, via the WLAN service provider, a cellular service response from the unassociated cellular network in response to the request, wherein the cellular service response does not include a cellular network profile that includes credentials of the unassociated cellular network, but allows the portable communication device to temporarily attach to the unassociated cellular network and download, via the unassociated cellular network, the cellular network profile including the credentials of the unassociated cellular network; and
obtaining, by the cellular network transceiver, the cellular network services with the unassociated cellular network using the cellular service response.

9. The portable communication device of claim 8, wherein the operation of discovering, by the cellular network transceiver, the unassociated cellular network comprises:
selecting the unassociated cellular network based upon predetermined criteria.

10. The portable communication device of claim 8, wherein the request causes the WLAN service provider to obtain the cellular service response from the unassociated cellular network by sending a profile request to at least one of:
an authentication, authorization, accounting (AAA) server of the unassociated cellular network,
a home location register/home subscriber server (HLR/HSS) of the unassociated cellular network, or
an evolved access network discovery and selection function (E-ANDSF) server of the unassociated cellular network.

11. The portable communication device of claim 8,
wherein if the cellular service response includes a cellular network profile including credentials of the unassociated cellular network, and
wherein the operation of obtaining, by the cellular network transceiver, the cellular network services with the unassociated cellular network using the cellular service response comprises associating and authenticating, by the cellular network transceiver, with the unassociated cellular network using the cellular network profile of the unassociated cellular network.

12. The portable communication device of claim 8,
mutually authenticating with an evolved access network discover and selection function (E-ANDSF) server of the unassociated cellular network; and
associating and authenticating, by the cellular network transceiver, with the unassociated cellular network using the cellular network profile of the unassociated cellular network.

13. The portable communication device of claim 8, wherein the cellular network is not profiled with a home network of the portable communication device.

14. A method in a wireless local area network (WLAN) service provider comprising:
receiving, via a WLAN associated with the WLAN service provider from a portable communication device registered with the WLAN, a request to obtain cellular network services with an unassociated cellular network, the unassociated cellular network being unassociated with respect to a home mobile network operator (MNO) of the portable communication device because the unassociated cellular network is unknown, untrusted, or unprofiled by the home MNO of the portable communication device;
in response to the request, sending a profile request to the unassociated cellular network over the Internet and receiving a cellular service response from the unassociated cellular network in response to the profile request, wherein the cellular service response does not include a cellular network profile that includes credentials of the unassociated cellular network, but allows the portable communication device to temporarily attach to the unassociated cellular network and download, via the unassociated cellular network, the cellular network profile including the credentials of the unassociated cellular network; and
providing the cellular service response from the unassociated cellular network to the portable communication device via the WLAN, wherein the cellular service response enables the portable communication device to obtain the cellular network services with the unassociated cellular network via a cellular transceiver of the portable communication device.

15. The method of claim 14, wherein if the cellular service response from the unassociated cellular network includes a cellular network profile including credentials required for the portable communication device to associate and authenticate with the unassociated cellular network.

16. The method of claim 14, wherein sending the profile request to the unassociated cellular network comprises sending the profile request via the Internet to at least one of:
an authentication, authorization, accounting (AAA) server of the unassociated cellular network;
a home location register/home subscriber server (HLR/HSS) of the unassociated cellular network, or
an evolved access network discovery and selection function (E-ANDSF) server of the unassociated cellular network.

17. The method of claim 14, wherein the unassociated cellular network is not profiled with a home network of the portable communication device.

* * * * *